May 8, 1945.   J. STARNENO   2,375,705
SPRING WHEEL
Filed June 16, 1942
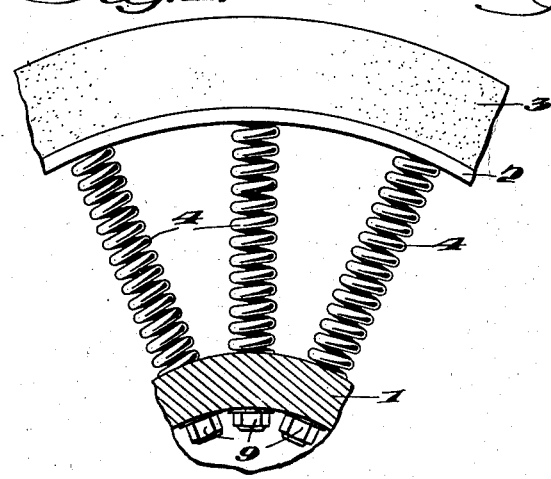
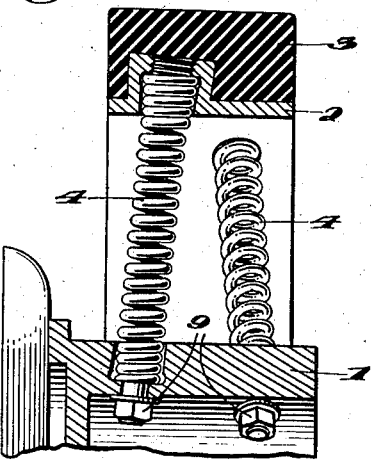
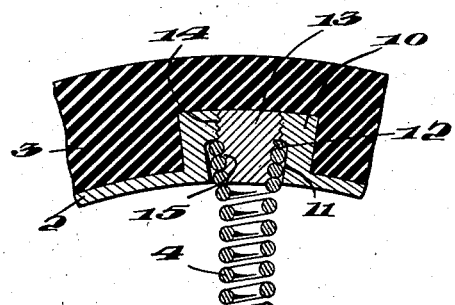
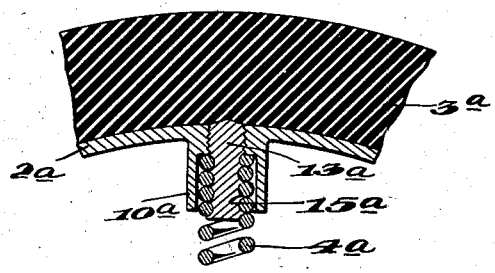
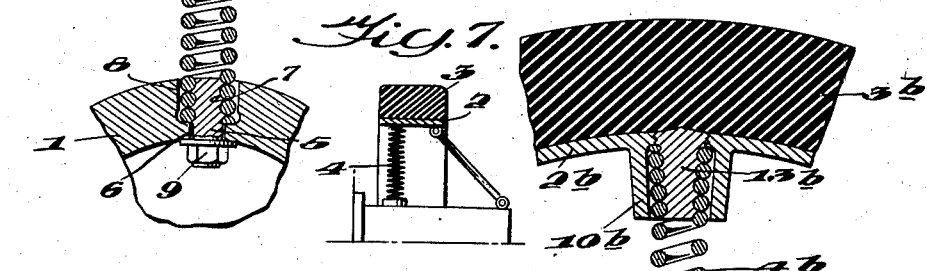
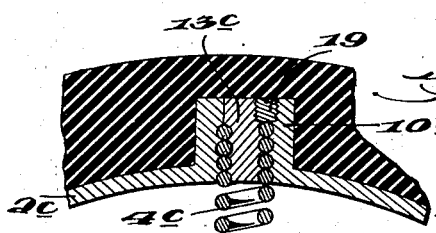

Patented May 8, 1945

2,375,705

UNITED STATES PATENT OFFICE 2,375,705

SPRING WHEEL

Joseph Starneno, Providence, R. I.

Application June 16, 1942, Serial No. 447,257

5 Claims. (Cl. 152—87)

This invention relates to an improvement in spring wheels, of the character used for automobiles or other motor vehicles to provide the desired resiliency in the support of such vehicle during transportation.

Spring wheels which have been proposed heretofore have been objectionable for several reasons, such as insufficient resiliency, insecure mounting of the springs on the hub and rim, impractical assembly of the parts of the wheel, making it difficult of manufacture, and in some instances requiring the use of bumpers or other rigid connections between the rim and hub.

The object of this invention is to improve the construction of such a resilient wheel and to make it commercially practical to manufacture and use, while providing the desired resiliency in the wheel with secure connection of the springs to the hub and rim in a manner which enables them to be assembled conveniently and readily.

In carrying out this object, I may utilize a conventional form of hub and rim, but connected together through coiled springs which form the sole connection therebetween, without any bumpers or other rigid connections, the springs providing the desired resiliency in the wheel, and being under compression, they hold the parts adequately spaced from each other without danger of breaking the springs, and keeping the convolutions spaced apart sufficiently so that the springs are not compressed at any time to an extent where they present a solid abutment between the hub and rim. The opposite ends of the springs are connected respectively with the hub and rim, through attachments which secure these ends rigidly in place, and which are practical for assembly in manufacture of the wheels without danger of the springs pulling loose from either the hub or the rim. In fact, each end of the spring is anchored so securely that it cannot be pulled out without disconnection of the coupling.

The invention is shown in different embodiments in the accompanying drawing, in which:

Fig. 1 is a side elevation of a portion of a wheel embodying this invention;

Fig. 2 is a transverse sectional view therethrough;

Fig. 3 is an enlarged vertical section through a portion of the wheel showing a spring assembly;

Fig. 4 is a detail vertical section showing a modified form of spring connection with the rim;

Figs. 5 and 6 are similar views showing other modified forms thereof; and

Fig. 7 is a vertical section showing a modified spring assembly.

The wheel illustrated in the drawing, as an example of my invention, is of the usual construction, inasmuch as it comprises a hub 1, and a rim 2, which are shown of conventional form, although the rim 2 is illustrated as having a solid rubber tire 3 thereon, forming the tread surface of the wheel, but any suitable or desired tread may be used with my spring wheel, it being unnecessary to provide a pneumatic tire therefor.

In this invention, the hub 1 and rim 2 are connected together through coiled springs 4, two sets of which are shown in Fig. 2, the sets of springs converging toward the periphery of the wheel, both sets being inclined as shown in Fig. 2, although one set may extend directly radially as shown in Fig. 7, while the other set converges relative thereto. In the form shown in Fig. 2, the load is taken uniformly on both sets of springs, while most of the load is taken on the radial set of springs in the modified form shown in Fig. 7, the outer connection then functioning to guide or stabilize the rim. In place of coiled springs forming such stabilizing connections, the latter may be rigid with connections to the rim and hub that would permit of relative yielding therebetween, as shown in Fig. 7.

The springs of the respective sets are staggered relative to each other at the points where they are joined respectively to the hub and rim. Each of the springs is inserted under compression, being contracted about one-sixth in normal size so as to exert a yielding pressure against the rim and hub while allowing for further compression during operation of the wheel. This arrangement holds the hub and rim in symmetrical relation with each other and yet allows the desired yieldability in the wheel.

I have shown in Fig. 3, the preferred manner of joining each spring 4 to the hub and rim respectively. This form of connection is particularly desirable, inasmuch as it securely anchors the spring to the respective parts of the wheel while it also permits ready assembly thereof.

The hub connection utilizes a stud 5 which is inserted through an orifice 6 in the hub 1, being loose therein, but the periphery of the stud 5 at the outer end thereof is provided with a spiral groove 7 forming a screw-thread thereon to receive the convolutions of the coiled spring 4 at the inner end. This thread 7 is so formed that it will draw the convolutions of the spring together into abutting relation, and thus form a rigid connection between the spring and the stud 5. A countersink 8 is formed in the hub 1 to receive the inner end of the spring around the stud.

At the outer end of the spring, the rim 2 is formed with a keystone-shaped portion 10 somewhat frustro-conical, with inwardly converging or tapering sides 11. The sides 11 have a peripheral groove 12 therein adjacent the outer end of the projecting portion 10 to receive the end convolution of the spring, while said end portion of the spring is confined by the walls 11. A stud 13 is secured in the outer end of the conical portion 10, being shown as screw-threaded therein at 14. The periphery of the inner end portion of the stud 13 is formed with a helical groove 15 that forms a thread to receive the convolutions of the outer end of the spring. The diameter of the thread 15 increases gradually in a radial direction so as to expand the outer end portion of the spring and press the same against the conical walls 11 and into the groove 12 so as to anchor securely said end portion of the spring to the rim. The keystone-shaped portion 10 serves also to anchor the tire 3 on the rim.

In assembling the wheel with the type of fastening means shown in Fig. 3, each spring is inserted in its proper position between the hub and rim, being contracted to the desired extent so as to be placed under compression and thereby impart radial push therebetween. The opposite ends of the spring 4 are inserted respectively in the countersink 8 and the recess formed by the tapering wall 11. Then the stud 5 is inserted through the orifice 6 and turned in screw fashion into the inner end of the spring 4, drawing the convolutions of the spring directly together into rigid relationship with the stud 5. A lock nut 9 is then applied to the inner end of the stud 5, anchoring the latter securely to the hub.

In like manner, the outer end of the spring is secured to the rim 2. The stud 13 is inserted into the portion 10 of the rim with the thread 15 turning into the convolutions of the spring and drawing them together in side-by-side relation while expanding these convolutions laterally into secure engagement with the converging walls 11 of the portion 10, the end convolution being anchored in the annular groove 12 of said portion. When the stud 13 is thus inserted by a turning motion, it also has a threaded connection at 14 with said portion of the rim and is thereby securely anchored thereto, thus holding the spring radially to the rim against danger of being pulled out in service.

Each of the springs is thus applied and secured in place and when the desired number are applied, these will effectively equalize and stabilize the wheel and rim relative to each other, holding them in their proper assembled relation.

In the form shown in Fig. 4, the rim 2a is provided with a cylindrical inwardly extending sleeve 10a which receives the outer end portion of the coiled springs 4a. A stud 13a is threaded in the rim and has a peripheral thread groove 15a on the inner portion thereof within the cylindrical sleeve 10a to draw the end convolutions together and to hold these bearing laterally against the inner wall of the sleeve 10a against accidental displacement from the stud 13a.

A similar construction is shown in Fig. 5, in which the sleeve 10b has the inner wall thereof converging inwardly in the relation shown in Fig. 3, thus spreading the outer end of the spring 4b and utilizing the tapered portion of the sleeve to prevent the spring from being pulled out, off the stud.

Still another form is shown of Fig. 6, in which the rim 2c has a sleeve portion 10c thereon to receive the outer end portion of the coiled spring 4c. A stud 13c is inserted into the end of the spring, contracting the convolutions into abutting relation, and holding the spring against displacement by the cooperating thread grooves thus formed between the stud and sleeve. The stud is anchored in place by a set screw 19 which is threaded into a recess formed partially in the stud and partially in the sleeve 10c.

It will be evident in these forms, that the stud may be secured rigidly in the rim, after which the spring may be secured thereto by rotating the spring in screw-fashion and thereby threading it onto the stud, thus anchoring the outer end of the spring securely in place. Each of the springs may thus be fastened to the rim, after which the inner ends thereof are secured to the hub by the insertion of the studs, such for instance, as those shown at 5 in Fig. 3.

I claim:

1. A spring wheel comprising a hub, a rim, and coiled expansion springs connecting the hub and rim together, said springs being under compression with the convolutions thereof spaced apart throughout the major portion of the length thereof and exerting expansive action on the rim and hub, the outer and inner ends of the springs being spaced apart axially of the wheel at the rim and hub respectively, and studs rigidly connected respectively to the hub and rim and extending into the respective ends of each coiled spring, each of said studs having a peripheral thread groove interfitting with the convolutions of the spring and securely anchoring the same thereto.

2. A spring wheel comprising a hub, a rim, and coiled expansion springs connecting the hub and rim together, said springs being under compression with the convolutions thereof spaced apart throughout the major portion of the length thereof and exerting expansive action on the rim and hub, the outer and inner ends of the springs being spaced apart axially of the wheel at the rim and hub respectively, studs rigidly connected respectively to the hub and rim and extending into the respective ends of each coiled spring, each of said studs having a peripheral thread groove interfitting with the convolutions of the spring and securely anchoring the same thereto, said thread groove having a pitch constructed to draw the convolutions of the spring directly together in side-by-side abutting relation, and means surrounding the end portion of the spring to hold the same in connected position on each stud.

3. In a spring wheel having a coiled spring interposed between the hub and rim, a lock for said spring comprising a sleeve portion receiving an end portion of the spring and having surrounding walls converging toward the opposite end of the spring, said surrounding walls having a groove therein to receive the end convolutions of the spring, and a stud extending into the said end of the spring and having a surrounding thread groove interfitting with the convolutions of the spring and of conical shape to expand said end of the spring into locked relation with the tapering walls and groove.

4. A spring wheel comprising inner and outer annular members, and coiled springs connecting said inner and outer annular members together, and means connecting said springs with the inner and outer annular members, said connecting means including a conical member having a peripheral thread groove interfitting with the convolutions of the spring at an end thereof, said groove being constructed to spread radially the convolutions adjacent the end of the spring.

5. A spring wheel comprising inner and outer annular members, and coiled springs connecting said inner and outer annular members together, and means connecting said springs with the inner and outer annular members, said connecting means including a conical member having a peripheral thread groove interfitting with the convolutions of the spring at an end thereof, said groove being constructed to spread radially the convolutions adjacent the end of the spring, and a sleeve surrounding said threaded member and holding the convolutions of the spring seated in the groove.

JOSEPH STARNENO.